Oct. 27, 1936.  L. McC. LEEDS  2,059,004

CATHODE RAY OSCILLOGRAPH SWEEP CIRCUIT

Filed Sept. 21, 1935  2 Sheets-Sheet 1

Inventor:
Laurance M. Leeds,
by Harry E. Dunham
His Attorney

Oct. 27, 1936.  L. McC. LEEDS  2,059,004
CATHODE RAY OSCILLOGRAPH SWEEP CIRCUIT
Filed Sept. 21, 1935  2 Sheets—Sheet 2
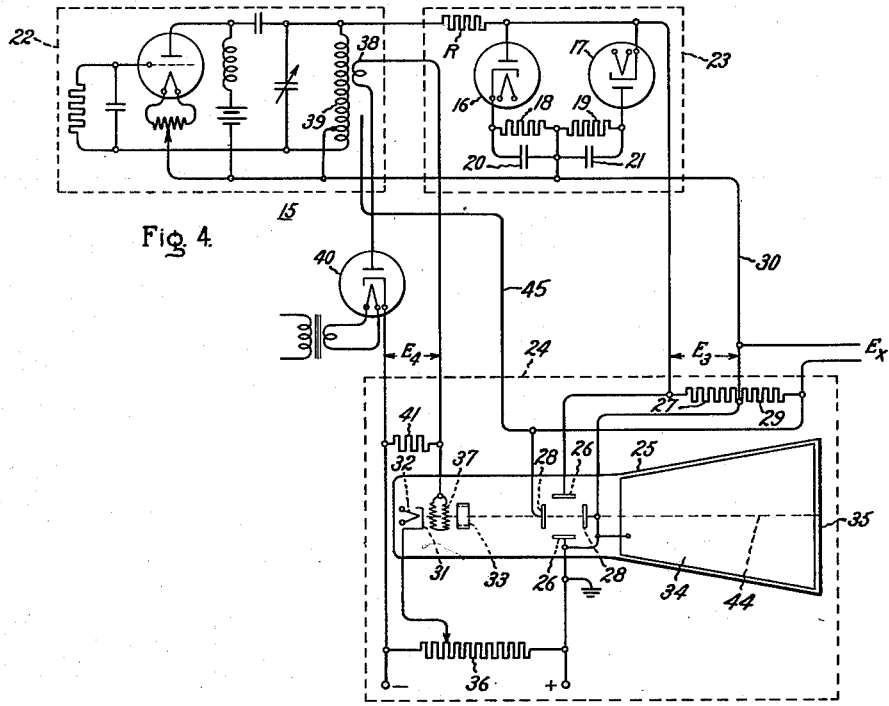
Fig. 4.
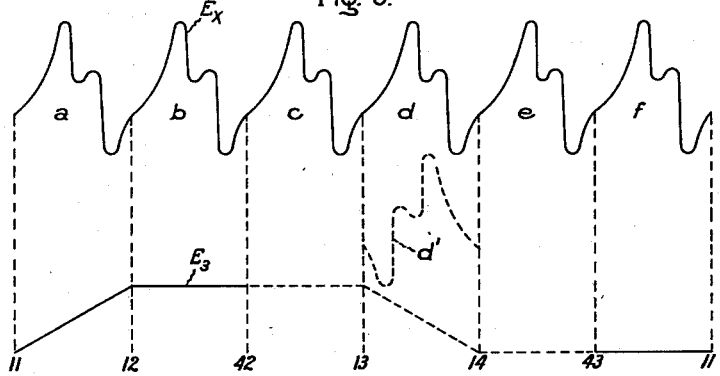
Fig. 5.
Fig. 6.  Fig. 7.
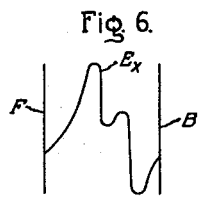 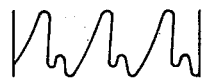
Inventor:
Laurance M. Leeds,
by Harry E. Dunham
His Attorney.

Patented Oct. 27, 1936

2,059,004

UNITED STATES PATENT OFFICE 2,059,004

CATHODE RAY OSCILLOGRAPH SWEEP CIRCUIT

Laurance McConnell Leeds, Schenectady, N. Y., assignor to General Electric Company, a corporation of New York Application September 21, 1935, Serial No. 41,575

7 Claims. (Cl. 171—95)

My invention relates to cathode ray oscillographs and in particular a recurrent high frequency time axis generator and circuit connections for such oscillographs. Circuits for this purpose are often called sweep circuits. An important object of my invention is to provide a sweep voltage generator for cathode ray oscillographs capable of producing sweep voltages for exceptionally high frequency investigation and adjustable over a wide range of frequencies whereby radio frequency waves up to the order of 30 million cycles per second may be pictured as a standing wave without distortion.

In carrying my invention into effect, I utilize selected, substantially straight, parallel line voltage varying portions of the waves from a suitable source of alternating current supply for the recurring sweep voltage. A conventional high frequency oscillator may be used as the source, and its voltage wave may be altered to segregate the used portions thereof by means of a high vacuum rectifier circuit. The invention also includes a novel synchronous cut off control of the cathode ray beam which may be used when investigating unsymmetrical wave shapes to eliminate any return trace of the sweep voltage whereby unobscured readily interpretable images of the unknown voltage wave are obtained.

The features of my invention which are believed to be novel and patentable will be pointed out in the claims appended hereto. For a better understanding of my invention, reference is made in the following description to the accompanying drawings wherein Fig. 1 is illustrative of how an alternating-current voltage wave is altered, and selected straight line portions thereof segregated, according to my invention.

Figure 1:
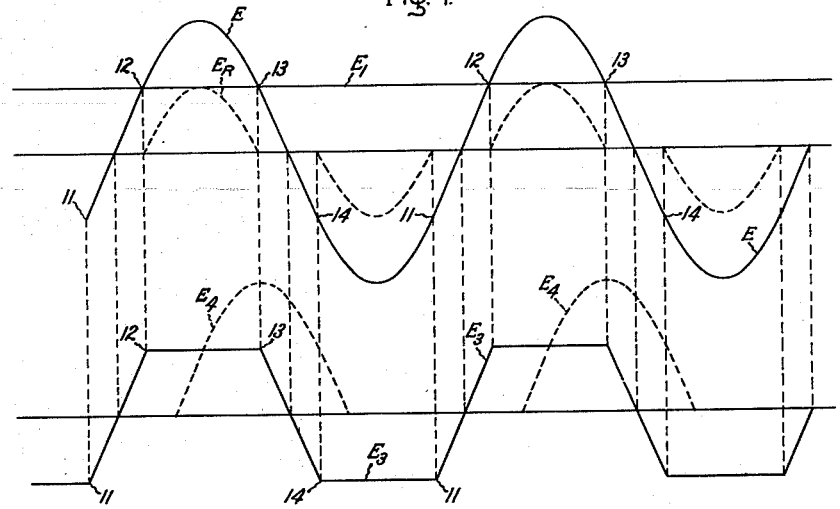
Figure 2:
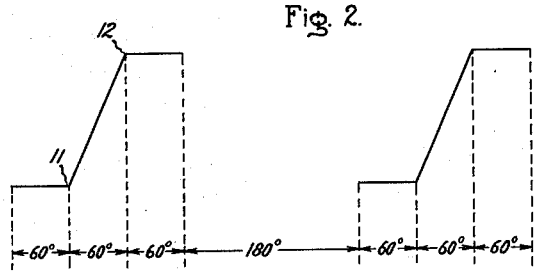
Figure 3:
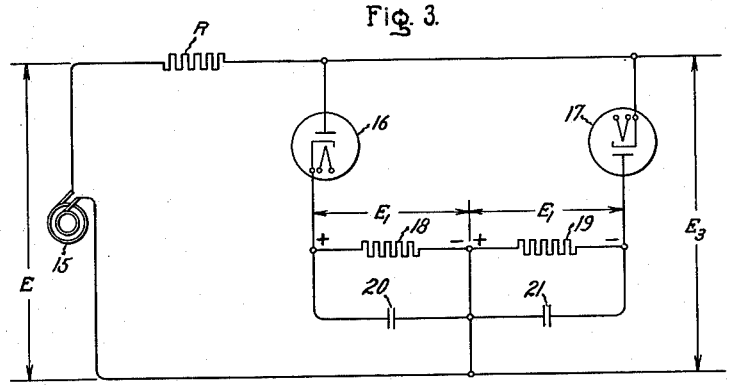

Fig. 2 represents those portions of the altered wave which are utilized as the sweep voltage. Fig. 3 represents a preferred form of sweep voltage generating circuit by means of which the flat topped wave of Fig. 1 may be obtained, Fig. 4 shows the manner of connecting such a sweep voltage generator to a cathode ray oscillograph and includes the synchronous cut off control for the cathode ray beam and the manner of establishing a synchronous relation between the sweep voltage and the unknown voltage under investigation.

Fig. 5 represents the timing relation between the unknown voltage wave and the sweep voltage wave as utilized in accordance with this invention when the sweep voltage frequency is one-sixth of the frequency of the unknown voltage; Fig. 6 represents the image that will appear on the cathode ray screen when the operation is as represented in Fig. 5; and Fig. 7 represents the type of image that may be obtained, using a sweep voltage frequency one-eighteenth of the unknown voltage frequency.

Referring to Fig. 1, I have shown at E a sine wave curve of an alternating current voltage such as will be used as the sweep circuit voltage source. It will be noted that those portions of the wave which cross the zero voltage line are substantially straight. These are the portions 11—12 for a rising voltage, and 13—14 for a falling voltage. These portions each cover ⅙ of the time of the complete cycle. The portions 11—12 for the rising voltage are parallel to each other as are the portions 13—14 for the falling voltage, and these portions recur in a definite spaced timed relation to each other. It has been ascertained that the lines 11—12 and 13—14 are sufficiently straight or linear that the corresponding voltages may be utilized as sweep voltages in a cathode ray oscillograph and that the resultant fluorescent trace will be linear to within the thickness of the trace line. Thus the voltages 11—12 may be used to sweep the cathode ray beam along a time axis in one direction between definite limits in a regularly recurring synchronous relation. It is desirable, however, to eliminate the effect of the remaining portions of the sine wave on the tracing movement of the cathode ray if clear records are to be obtained.

The manner of eliminating the maximum plus and minus hump portions of the wave (the portions 12—13 and 14—11) will next be explained, and for this purpose I prefer to use a high vacuum rectifier circuit shown in Fig. 3. In Fig. 3, 15 represents a source of supply for the sine wave voltage under consideration, namely, the wave E, Fig. 1. In Fig. 3, R is a non-inductive resistance connected between the source 15 and a full wave rectifier circuit consisting of rectifier tubes 16 and 17, non-inductive resistances 18 and 19, and condensers 20 and 21. The tubes are reversely connected so that any current from source 15 passing through the rectifier circuit flows through tube 16, and resistance 18 in one direction, and through tube 17 and resistance 19 in the opposite direction. Such current impulses charge the condensers 20 and 21. Aside from the direction of current flow, the two rectifier circuits are similar, that is, resistance 18 is of the same value as resistance 19, the by-pass condensers are similar, and the tubes are similar.

In the steady state operating condition resistors 18 and 19 and their associated condensers assume potentials $E_1$ with polarities as indicated in Fig. 3. During those portions of a cycle when the voltage $E$ of source 15 is less than $E_1$, no current will flow through the tubes or resistance $R$, and the potential $E_3$ across the complete rectifier circuit will be identical with voltage $E$. During those portions of the cycle when voltage $E$ exceeds $E_1$, the tubes will pass current, and there will be a voltage drop $E_R$ across resistance $R$ equal to $E-E_3$ which is practically equivalent to $E-E_1$ because the voltage drop in the tubes is small in comparison to $E$ and $E_1$ and may be neglected. The constants of the circuit are adjusted so that the tubes pass current only when the voltage $E$ exceeds that corresponding to the straight line portions of the wave 11—12 and 13—14 of Fig. 1. Those portions of voltage $E$ corresponding to the humps between points 12—13 and 14—11 of Fig. 1 are then dissipated in resistance $R$ so that the voltage $E_3$ equals $E$ minus $E_R$ remains as the flat topped curve plotted at the bottom in Fig. 1. The average or steady state voltage $E_1$ for the positive rectifier branch is shown and the voltages $E_R$ are plotted in the curves of Fig. 1. In practice, instantaneous changes in the slope of the voltage curve $E_3$ will not be obtained due to the inertia of the circuit, but sufficiently rapid change is obtained to make the apparatus readily usable.

It is also possible to so proportion the resistances $R$, 18 and 19 that $E_1$ is equal to ½ of $E$ maximum, thus cutting off the straight portions of the voltage wave at points 11 and 12, 13 and 14 leaving the constant voltage variation portions 11—12 and 13—14 each extending in time over a definite predetermined fraction, in this case over exactly ⅙, of the complete time cycle of the parent voltage wave $E$.

The portion of the wave $E_3$ lying between points 11—12 or between points 13—14 is used for the practically linear variation of voltage with respect to time; linear to within the thickness of the cathode ray trace line. If the section 11—12 is used, then section 13—14 should usually be suppressed or vice versa. This suppression is generally necessary to avoid obscuring of the image trace when unsymmetrical wave shapes are being investigated because the direction of sweep is reversed and in such a case the two images would not be superposed, hence, the effect of one of these voltages should be eliminated except where the unknown voltage wave is symmetrical or it is desirable for any reason to obtain the two images. The constant voltage parts, such as from 12 to 13, of the wave $E_3$ are not bothersome because being constant, they have no sweeping action and would not confuse the image traced.

I accomplish the desired result by cutting off the beam of the cathode ray oscillograph during the return sweep interval so that the sweep voltages which are effective are of the character pictured in Fig. 2. To explain how this is accomplished, reference is made to the wiring diagram of Fig. 4, showing my sweep voltage generating apparatus connected up to a cathode ray oscillograph. The apparatus shown in Fig. 4 is grouped into three sections for the purpose of shielding, and the dash line inclosures 22, 23 and 24 represent suitable metal shielding inclosures. In the inclosure 22 is a conventional type of variable frequency oscillation generator which corresponds to the source 15 of Fig. 3. It has means such as the variable condenser shown for adjusting its generated frequency. In the inclosure 23 is the high vacuum rectifier circuit, previously explained, for changing the sine wave $E$ to the shape $E_3$ (see Fig. 1). The inclosure 24 contains the cathode ray oscillograph apparatus, the tube of which is designated 25.

The flat topped voltage wave $E_3$ from the sweep voltage apparatus is applied across the sweep plates 26 of the tube 25.

The unknown pulsating voltage to be investigated is designated $E_x$ and is applied to the other or unknown voltage plates 28 of the tube which are, as usual, arranged on a line at right angles to the alignment of the sweep plates across the axis of the tube, the illustration being diagrammatic. The resistors 27 and 29 are generally known as "static drain resistors" and have for their purposes to prevent either of the ungrounded deflection plates 26 and 28 from building up an electrostatic charge which would give a permanent deflection to the cathode beam. These resistors are of the order of ten million ohms so as to have no effect on the impressed voltage to the deflection plates.

It will be noted that I have provided a wire 45 running from the ungrounded side of the unknown voltage source circuit to the interior of the shield about the oscillation generator 15. When the unknown voltage is of radio frequency, this type of connection is sufficient to readily enable the oscillation generator to generate a frequency which is some definite fraction of the frequency of the unknown voltage and establish stable synchronization between the two frequencies. In fact, where no shield is provided about the oscillation generator, it has been found possible to establish stable synchronizing between the two frequencies with no such wire connection but simply by carefully orienting the oscillation generator. This is because this type of generator is very sensitive to electrostatic disturbances and will readily synchronize with such disturbances at some sub-multiple of the disturbance frequency near that for which the oscillation generator is adjusted. It is desirable, however, to shield the apparatus to prevent erratic operation due to various other sources of disturbance, but it will be readily seen that there is no difficulty whatever in establishing the necessary synchronous relation between the sweep voltage frequency and that of the unknown voltage by some such connection as is represented by the wire 45. This wire is only one of a variety of expedients that might be used to serve for the purpose of establishing the necessary unknown voltage frequency synchronizing influence on the oscillation generator. In establishing such synchronizing tie, care should be taken to see that none of the unknown voltage $E_x$ gets into the sine wave distortion circuits, as this would produce distortion in the image traced. The oscillation generator is, of course, adjustable for a wide variety of frequencies, but its adjustment does not need to be very exact in order to establish synchronism with the high frequency of the unknown voltage with the oscillation generator operating at some desired sub-multiple of such high frequency.

The tube 25 is provided, as usual, with a cathode 31 with a heating unit 32, an electrode 33 for accelerating the cathode ray beam and a metallic coating 34 about the interior of the enlarged screen end of the tube for attracting the cathode ray beam to the fluorescent screen at 35. A suitable direct-current source of supply is connected across a resistance 36 for creating the necessary potential differences on the electrodes 31, 33 and 34, for the proper generation and projecting of the cathode ray beam. One of the sweep plates 26 and one of the unknown voltage deflecting plates 28 are also connected to the positive side of the cathode voltage potentiometer 36, and this point is grounded to the shield 24 for protection purposes. No attempt has been made to illustrate the details of construction of the tube electrodes as this constitutes no part of the present invention.

As thus connected, it will be apparent that the complete flat topped wave of the voltage $E_3$ (Fig. 1) will be impressed across the sweep plates 26, and there remains to be explained how the cathode ray is cut off so that the tracing beam indicated at 44 will be swept across the screen in one direction only, thereby obtaining the effect of only that part of the sweep plate voltage depicted in Fig. 2.

For this purpose I have provided a cut off electrode 37 between the cathode 31 and the accelerating electrode 33 which is biased synchronously with the frequency of the sweep voltage $E_3$. The biasing circuit is energized from a secondary winding 38, usually single turn winding, associated with the reactance 39 across the output terminals of the oscillation generator 15. It will be apparent then that the voltage impressed on electrode 37 will be in synchronism with the sweep voltage $E_3$. Included in series with the winding 38 there is a high vacuum rectifier tube 40 and a resistance 41. The tube 40 allows current to pass only in one direction through this circuit and produces a unidirectional voltage drop, pulsating in character, across resistance 41. That end of resistance 41 which is positive in the circuit of rectifier tube 40 is connected to the negative side of the cathode potentiometer resistance 36 and the cut off electrode 37 is connected to the opposite end of resistance 41. Thus it will be apparent that when a unidirectional current pulsation flows in resistance 41, cut-off electrode 37 will be biased strongly negative with respect to the cathode 31. While this does not stop the generation of electrons at the heated cathode, it does prevent them from being projected past cut-off electrode 37 during the time this electrode is sufficiently negative. This negative biasing impulse on electrode 37 should lag about 90 degrees behind the used sweep voltage impulse, and in Fig. 1 I have represented by the dotted line curves marked $E_4$ the approximate phase relation of the cut-off voltage impulses with respect to the sweep voltage $E_3$ when the useful portion of the sweep voltage is as shown in Fig. 2. I have not found it necessary to use any phase shifting in the cut off voltage circuit to obtain the desired phase-angle relation between voltages $E_3$ and $E_4$ other than the inherent phase shift in the circuit itself which is due primarily to the transformer connection at 38. It will be understood then that this circuit contains phase-shifting means either inherent or otherwise to obtain the proper phase relation of the cut-off biasing voltage $E_4$. The exact point of cut off and reprojecting of the cathode ray beam is not important so long as the beam is stopped during all of the time one of the voltage variations 13—14 or 11—12 of $E_3$ is impressed across the sweep plates 26 of the tube and is allowed to pass during all of the time the other of these voltages is impressed across the sweep plates so that the beam traces on the fluorescent screen when being deflected along a time axis in one direction only. Thus where the part 11—12 (Fig. 1) is used as the effective sweep voltage, the beam should be cut off between points 12 and 13 and should be reprojected between points 14 and 11. I have found that the bias of cut-off grid 37 may be made sufficiently great to cut off the beam very close to point 12 and returned to the screen very close to point 11.

To coordinate and review the manner of operating a cathode ray oscillograph applying the sweep voltage features of my invention, let us assume we desire to produce a visual picture of the wave shape of a radio frequency current of the character represented at $E_x$ in Fig. 5 having a frequency of 10 million cycles per second, 6 complete cycles being shown. We impress a voltage $E_x$ proportional to such current across the deflecting plates 28 of the cathode ray oscillograph tube. The remainder of the apparatus being in operation, the frequency of oscillation of the oscillation generator 15 is adjusted until the trace on the screen 35 becomes clear and appears as a standing wave such as is shown in Fig. 6. Then we know that the oscillation generator frequency is $\frac{1}{6}$ of the unknown voltage frequency and that the two are in synchronism. It is unnecessary to know what either the frequency of $E_x$ or $E_3$ is to obtain this result. Under these conditions, we may represent the luminous and inactive portions of the sweep voltage cycle by the full and dotted line portions of the $E_3$ curve drawn below curve $E_x$ in Fig. 5. Over the portions 11 to 42 and 43 to 11, the cathode ray beam is projected to the screen. Over the portion 42 to 43, the cathode ray beam is cut off. Over the portion 11 to 12, the sweep voltage increases in a linear manner to trace the section $a$ of $E_x$ (Fig. 5) as $E_x$ (Fig. 6) on the fluorescent screen 35 of the tube 25. Over the portion 12 to 42 the sweep voltage is constant and holds the beam stationary with respect to the time axis while the $b$ wave of $E_x$ (Fig. 5) traces the vertical line B (Fig. 6). Over the time from 42 to 43, the cathode beam is cut off and no part of waves $c$, $d$ and $e$ are traced on the screen. If the beam had not been cut off over the time from 13 to 14, there would have been traced on the screen another image of the wave $d$ but in reversed relation as indicated in dotted lines at $d'$ (Fig. 5). Whereas here the wave of voltage $E_x$ is unsymmetrical this would, of course, be confusing, and the reason for suppressing the trace over this return of the sweep voltage under such conditions is thus illustrated. Over the period from 43 to 11, the sweep voltage is again constant and holds the cathode beam stationary with respect to the time axis while wave $f$ (Fig. 5) traces the vertical line F (Fig. 6) on the screen. It will be evident that the vertical line traces B and F (Fig. 6) do not obscure the trace of the voltage wave $E_x$ but serve to more clearly define its length along the time axis.

This operation is repeated at the frequency of $E_3$ so that every sixth wave of $E_x$ is properly traced along the same time axis on the screen, and the persistence of vision allows the trace to be observed as a standing wave. The wave $E_x$ (Fig. 5) was assumed to have a frequency of 10 million cycles per second. Let us assume now that we desire to picture a wave $E_x$ of 30 million cycles per second. Preferably we would now increase the frequency of the oscillation generator to 5 milion cycles per second and obtain the same relations as exemplified in Fig. 5. This, however, is unnecesary as we may allow the oscillation generator to oscillate at the same frequency as before, namely, at $\frac{1}{6}$ of 5 million cycles per second, as it will oscillate synchronously with the frequency of $E_x$ at 1/18 of such frequency.

In this case we would obtain a three wave trace of $E_x$ on the screen as represented in Fig. 7 over the active 1/6 cycle of the sweep frequency. The image could, of course, be enlarged by increasing the plate voltages so that only approximately the center wave of this group would appear on the screen. Likewise with a frequency for $E_3$ 1/12 of the frequency of $E_x$ we would obtain a two wave group image of $E_x$ on the screen. The synchronous relation between the sweep voltage and unknown voltage frequencies should be such that one or more complete cycles of the unknown voltage shall occur during the predetermined fraction of the time of the sweep voltage cycle when the sweep voltage is varying in a linear manner.

It may be thought that an arrangement such as this, wherein the maximum average time of exposure is at the most only 1/6 of the total time, would have poor luminosity. Such is not the case if suitable apparatus is used. Best results may be expected from this apparatus when adequately and effectively shielded to prevent influences from stray fields. It is advisable to ground one terminal of the unknown voltage connection to prevent any capacity effect between this circuit and ground that might alter the characteristics of the unknown voltage wave. In general, the precautions of this character that should be taken are those which should be taken with any high frequency measuring apparatus if reliable results are expected.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. In combination with a cathode ray oscillograph having the usual sweep and unknown voltage plates, a sweep voltage circuit therefor comprising a source of variable frequency alternating current having substantially a sine wave voltage, a circuit upon which said voltage is impressed for suppressing the maximum plus and minus portions of such voltage wave and producing a flat-topped trapezoidal shaped voltage wave therefrom leaving the portions of the sine wave between the flattened portions undistorted and each extending over one-sixth of the time of the complete wave, connections for impressing such flat-topped voltage wave on the sweep plates of the oscillograph, connections for impressing another pulsating voltage to be investigated across the unknown voltage plates of the oscillograph, and means for establishing a synchronous relation between the sweep voltage frequency and the frequency of said other pulsating voltage such that one or more complete cycles of such other pulsating voltage will occur during one-sixth of the time of the complete sweep voltage cycle.

2. In combination with a cathode ray oscillograph having sweep plates of means for producing a sweep voltage therefor comprising a variable frequency oscillation generator for producing a substantially sine wave voltage, a circuit connecting said source across the sweep plates, said circuit containing a resistance, a pair of rectifiers reversely connected across said circuit beyond the resistance so as to produce a voltage drop in said resistance when the rectifiers pass current in either direction, each rectifier having a resistance shunted by a condenser connected in series therewith across said circuit, the constants of the rectifier load circuit thus formed being such as to change the sine wave voltage produced by said generator into a symmetrical flat-topped wave form which is applied to the sweep plates of the oscillograph.

3. A circuit for obtaining a trapezoidal shaped alternating voltage wave suitable for the sweep voltage of a cathode ray oscillograph comprising a substantially sine wave voltage source of alternating current, a resistance in series with said source, and a rectifier circuit connected across said source through said resistance, said rectifier circuit having parallel branches each containing a rectifier in series with parallel connected resistance and capacity, the parallel branches being similar except that the rectifiers are reversely connected therein, the constants of said sweep voltage circuit being such with respect to the voltage of the source that the rectifiers pass current only when the voltage of said source reaches one-half its maximum value in either direction and the voltage components of said source in excess of one-half of such maximum value in either direction are dissipated as voltage drop in the first mentioned resistance.

4. In combination with a cathode ray oscillograph having a tracing screen and cathode ray beam producing, projecting, and deflecting electrodes, a sweep voltage circuit therefor comprising means for producing a variable frequency alternating sweep voltage having similar, regularly recurring, substantially linear, voltage increasing portions and similar, regularly recurring, substantially linear, voltage decreasing portions, the voltage-increasing and voltage-decreasing portions alternating in time and being separated by constant voltage portions, connections for impressing said voltage across a pair of deflecting electrodes of said oscillograph, electrode means for said oscillograph which, when biased by a suitable voltage, prevents the cathode ray beam from tracing on the screen of said oscillograph, and a circuit energized synchronously with the frequency of the sweep voltage circuit for synchronously biasing the last mentioned electrode to prevent the cathode ray beam from tracing on the screen during alternate linear voltage varying portions of said sweep voltage.

5. In combination with a cathode ray oscillograph having a screen, a cathode beam producing electrode, a cathode beam projecting electrode and sweep plates for sweeping the beam across the screen as it is projcted thereon, a source of alternating voltage connected across said sweep plates having characteristics which would ordinarily sweep the cathode ray beam across said screen alternately in opposite directions, and means for preventing the tracing action of the beam on the screen in one of said directions comprising a cut-off electrode for said oscillograph located between the cathode beam producing electrode and the cathode beam projecting electrode, and means for producing a pulsating biasing voltage on said cut-off electrode in synchronous relation with the alternating voltage applied to the sweep plates, which biasing voltage is sufficient to intermittently neutralize the beam projecting effect of the projecting electrode of the oscillograph and is of such phase relation with respect to the sweep voltage as to prevent projection of the cathode ray beam on the screen during the period when it would otherwise be swept in one direction only.

6. In combination, a cathode ray oscillograph having a screen, a cathode beam producing electrode, a cathode beam projecting electrode and sweep plates for sweeping the projected beam across the screen, a source of alternating voltage connected across the sweep plates of such character as would ordinarily sweep the beam across the screen alternately in opposite directions, means for preventing the tracing action of said beam in one of said directions comprising a cut-off electrode located adjacent the projecting electrode of the oscillograph, and a circuit for intermittently impressing a voltage on the cut-off electrode sufficient to neutralize the projecting effect of the projecting electrode, said circuit containing a resistance and a rectifier and being energized from said source of alternating voltage, the end of said resistance which is negative in said rectifier circuit being connected to the cut-off electrode and the other end being connected to the cathode beam producing electrode of the oscillograph, said circuit including phase-shifting means whereby the phase relation between the voltage applied to the sweep plates and the biasing voltage applied to the cut-off electrode prevent the projection of the cathode beam to the screen during those intervals when the beam would otherwise be swept in one direction but allows the beam to be projected when swept in the opposite direction.

7. In combination with a cathode ray oscillograph having a tracing screen, electrodes for producing and projecting a cathode ray beam on said screen and two sets of plates for respectively moving said beam across said screen at right angles in response to a sweep voltage and to a voltage to be investigated, a sweep voltage circuit connected to the sweep plates of the oscillograph, said circuit comprising means for producing an alternating voltage having similar, regularly recurring, substantially linear, voltage-increasing portions and similar, regularly recurring, substantially linear, voltage-decreasing portions, said increasing and decreasing voltage-varying portions alternating with each other and being separated in time by constant voltage portions, a source of pulsating voltage to be investigated connected to the remaining plates of said oscillograph, means including means for adjusting the frequency of the sweep voltage for establishing a synchronous relation between the frequencies of the sweep voltage and the voltage to be investigated such that at least one complete wave of the last mentioned voltage will occur during a single voltage-varying period of the sweep voltage, and a cathode ray beam cut-off electrode for said oscillograph energized synchronously from the sweep voltage circuit for intermittently preventing the cathode ray beam from tracing on said screen of the oscillograph, said cut-off action being effective during periods of time exclusive of the one of the alternate varying voltage periods of the sweep voltage and inclusive of the other alternate varying voltage periods of the sweep voltage.

LAURANCE McCONNELL LEEDS.